United States Patent
Rohlfing et al.

(10) Patent No.: US 11,068,902 B2
(45) Date of Patent: Jul. 20, 2021

(54) SYSTEMS AND METHODS FOR SETTLING CHARGEBACK REQUESTS

(71) Applicant: MASTERCARD INTERNATIONAL INCORPORATED, Purchase, NY (US)

(72) Inventors: Joan Lee Rohlfing, Maryland Heights, MO (US); John Harold Kolb, St. Louis, MO (US); Michael Scott Powell, Eureka, MO (US); Mark F. Carosello, Crestwood, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 22 days.

(21) Appl. No.: 16/434,762

(22) Filed: Jun. 7, 2019

(65) Prior Publication Data

US 2020/0387902 A1   Dec. 10, 2020

(51) Int. Cl.
*G06Q 20/40* (2012.01)
*G06Q 20/38* (2012.01)
*G06Q 20/36* (2012.01)

(52) U.S. Cl.
CPC ....... *G06Q 20/407* (2013.01); *G06Q 20/3676* (2013.01); *G06Q 20/382* (2013.01); *G06Q 20/401* (2013.01)

(58) Field of Classification Search
CPC .. G06Q 30/06; G06Q 20/407; G06Q 20/3676; G06Q 20/382; G06Q 20/401
See application file for complete search history.

(56) References Cited

U.S. PATENT DOCUMENTS

| | | | |
|---|---|---|---|
| 7,249,113 B1 * | 7/2007 | Continelli | G06Q 20/02 705/309 |
| 7,464,057 B2 | 12/2008 | Cole et al. | |
| 7,925,586 B2 | 4/2011 | Cole et al. | |
| 8,346,638 B2 | 1/2013 | Phillips et al. | |
| 8,364,583 B1 * | 1/2013 | Mussman | G06Q 10/06 705/39 |
| 9,996,834 B2 | 6/2018 | Powell et al. | |

(Continued)

*Primary Examiner* — Scott C Anderson
*Assistant Examiner* — Marla Hudson
(74) *Attorney, Agent, or Firm* — Armstrong Teasdale LLP

(57) ABSTRACT

Described herein are chargeback settlement processing systems and methods. A chargeback settlement computing device is configured to store a dispute table including a dispute record associated with a first chargeback request associated with a first chargeback transaction. The dispute record includes an account identifier, a chargeback transaction amount, and a unique chargeback identifier. The computing device is also configured to receive (i) a clearing detail record including a unique chargeback reference number associated with clearing/settlement of the chargeback transaction and chargeback transaction data, and (ii) a chargeback response including the chargeback identifier, the chargeback reference number, and chargeback transaction data. The computing device is configured to determine whether the dispute record, the clearing detail record, and the chargeback response match, and generate an individual reconciliation record using data from the dispute record, the clearing detail record, and/or the chargeback response.

21 Claims, 9 Drawing Sheets

(56) References Cited

U.S. PATENT DOCUMENTS

| | | | |
|---|---|---|---|
| 2004/0006539 A1* | 1/2004 | Royer | G06Q 20/02 705/40 |
| 2004/0148255 A1 | 7/2004 | Beck et al. | |
| 2005/0177464 A1 | 8/2005 | Komem et al. | |
| 2007/0038523 A1 | 2/2007 | Komem et al. | |
| 2010/0145744 A1 | 6/2010 | Beck et al. | |
| 2012/0005054 A1 | 1/2012 | Agarwal et al. | |
| 2012/0330718 A1 | 12/2012 | Jain et al. | |
| 2015/0348208 A1* | 12/2015 | Nordyke | G06Q 40/12 705/30 |
| 2017/0372314 A1* | 12/2017 | Baggett | G06F 16/245 |

* cited by examiner

132

INDIVIDUAL RECONCILIATION FILE
DATE

---

CHARGEBACK REQUESTS

| | | |
|---|---|---|
| CARD ACCT NUMBER | | |
| CHARGEBACK REF NO | MERCHANT NAME | ORIGINAL DATE/TIME | CARDHOLDER AMT |
| ORIGINAL CURR | REASON CODE | LOCATION | CARDHOLDER CCA |
| CODE/AMT | | ACQUIRER | SETTLEMENT CURR |
| ACCT TYPE/NUMBER | CHARGEBACK | REFERENCE NUM | CODE / AMT |
| | REFERENCE NUMBER | ACQUIRER ID | |
| DISPUTE IDENTIFIER | CHARGEBACK IDENTIFIER | | |
| COMMENTS | | | |
| MESSAGES | | | |

---

CATEGORY TOTALS: OUTGOING CHARGEBACKS

| | CURRENCY | EXCEPTION DEBITS | | EXCEPTION CREDITS | |
|---|---|---|---|---|---|
| | | COUNT | AMT | COUNT | AMT |

CARDHOLDER AMOUNT
SETTLEMENT AMOUNT
EXCEPTION AMOUNT

--- END OF REPORT ---

FIG. 6

SYSTEMS AND METHODS FOR SETTLING CHARGEBACK REQUESTS

BACKGROUND

The field of the present disclosure relates generally to chargeback transactions, and more particularly systems and methods for processing chargeback requests and providing to an issuer a reconciliation chargeback message containing a plurality of individual chargeback transaction records, wherein each individual chargeback transaction record includes chargeback amounts, interchange amounts, currency exchange rates, and other information required by an issuer to post and settle each individual chargeback transaction.

Occasionally, a cardholder may be unsatisfied with the goods or services provided by a merchant for a purchase transaction. The cardholder may return the goods or services and request a chargeback from the cardholder's issuer. In these known cases, the issuer may send the chargeback request to an issuer processor. The issuer processor may receive a plurality of chargeback requests from an issuer and submit a batch of chargeback requests to a payment card network for further processing. Each individual chargeback request may include a chargeback amount, an interchange amount, and may involve the use of a currency exchange rate. The interchange amount is the amount of revenue acquired by the issuer for completing an electronic payment transaction and is generally paid by the merchant involved in the initial purchase transaction. When a chargeback transaction is processed, the issuer returns funds equal to the interchange amount to the merchant. Accordingly, a net amount of funds returned to the issuer may be the overall chargeback amount (e.g., a purchase amount associated with the purchase transaction) less the interchange amount. In addition, processing chargeback transactions involving the use of currency exchange rates may result in a gain or a loss to the issuer if the currency exchange rate in effect is different from the exchange rates that were in effect during the original transaction.

The batch of chargeback requests and associated chargeback transactions are processed by the payment card network, and the issuer processor transmits a reconciliation chargeback message back to the issuer. In some known cases, the reconciliation chargeback message only includes a total net amount that potentially covers a plurality of individual chargeback transactions, without providing details about each individual chargeback transaction. In these known cases, an issuer may be unable to determine whether a gain or a loss was realized upon receipt of settlement funds from the payment card network (e.g., based on interchange amounts and/or currency exchanges rates). To address such gains or losses requires manual intervention for each individual chargeback transaction to reconcile an 'out of balance' condition and then the creation of a separate adjustment transaction for the difference.

It is desirable to provide a method and system for providing data representing individual chargeback transactions to provide to an issuer details about settlement of a chargeback transaction.

BRIEF DESCRIPTION

In one aspect, a chargeback settlement processing computing device is provided, the chargeback settlement processing computing device including a memory device for storing data, and a processor in communication with the memory device. The processor is programmed to store, in a dispute table in the memory device, a dispute record associated with a first chargeback request initiated by a first cardholder. The first chargeback request is associated with a first chargeback transaction and includes a first set of chargeback transaction data including a first chargeback transaction amount and an account identifier associated with the first chargeback request. The dispute record includes the account identifier, the first chargeback transaction amount, and a unique chargeback identifier indicating acceptance of the first chargeback transaction. The processor is also programmed to receive, from a payment processing computing device, a clearing detail record. The clearing detail record includes a unique chargeback reference number associated with clearing and settlement of the first chargeback transaction and the first set of chargeback transaction data. The processor is further programmed to receive, from a dispute management computing device, a first chargeback response message associated with the first chargeback transaction. The first chargeback response message includes the unique chargeback identifier, the unique chargeback reference number, and the first set of chargeback transaction data. The processor is also programmed to determine, based on the account identifier and the unique chargeback reference number, whether the first chargeback response message matches the clearing detail record, and, when the first chargeback response message matches the clearing detail record, determine, based on the account identifier and the unique chargeback identifier, whether the dispute table includes a matching dispute record including the account identifier and the unique chargeback identifier. The processor is still further programmed to, when a matching dispute record is identified, generate an individual reconciliation record, wherein the individual reconciliation record includes data from the first chargeback response message, the clearing detail record, and the matching dispute record, and transmit the individual reconciliation record to an issuer of a payment account associated with the account identifier.

In another aspect, a chargeback settlement processing computing device is provided. The chargeback settlement processing computing device includes a memory device for storing data, and a processor in communication with the memory device. The processor is programmed to receive, from a payment processing computing device, a clearing detail record. The clearing detail record includes (i) a unique chargeback reference number associated with clearing and settlement of a first chargeback transaction, and (ii) a first set of chargeback transaction data associated with the first chargeback transaction including a chargeback transaction amount and an account identifier. The processor is also programmed to receive, from a dispute management computing device, a first chargeback response message including a unique chargeback identifier associated with the first chargeback transaction and indicating acceptance of the first chargeback transaction by the dispute management processor. the processor is further programmed to determine, based on the account identifier and the unique chargeback reference number, whether the first chargeback response message matches the clearing detail record, and, when the first chargeback response message matches the clearing detail record, generate an individual reconciliation record. The individual reconciliation record includes data from the first chargeback response message and the clearing detail record. The processor is still further programmed to transmit the individual reconciliation record to an issuer of a payment account associated with the account identifier.

In a further aspect, a computer-implemented method for generating an individual reconciliation record is provided. The method is implemented using a computing device including a processor in communication with a memory device for storing data. The method includes storing, in a dispute table in the memory device, a dispute record associated with a first chargeback request associated with a first chargeback transaction and including a first set of chargeback transaction data including a first chargeback transaction amount and an account identifier associated with the first chargeback request. The dispute record includes the account identifier, the first chargeback transaction amount, and a unique chargeback identifier indicating acceptance of the first chargeback transaction. The method also includes receiving, from a payment processing computing device, a clearing detail record. The clearing detail record includes a unique chargeback reference number associated with clearing and settlement of the first chargeback transaction and the first set of chargeback transaction data. The method further includes receiving, from a dispute management computing device, a first chargeback response message associated with the first chargeback transaction. The first chargeback response message includes the unique chargeback identifier, the unique chargeback reference number, and the first set of chargeback transaction data. The method also includes determining, based on the account identifier and the unique chargeback reference number, whether the first chargeback response message matches the clearing detail record, and, when the first chargeback response message matches the clearing detail record, determining, based on the account identifier and the unique chargeback identifier, whether the dispute table includes a matching dispute record including the account identifier and the unique chargeback identifier. The method still further includes, when a matching dispute record is identified, generating an individual reconciliation record, wherein the individual reconciliation record includes data from the first chargeback response message, the clearing detail record, and the matching dispute record, and transmitting the individual reconciliation record to an issuer of a payment account associated with the account identifier.

In yet another aspect, a computer-implemented method for generating an individual reconciliation record is provided. The method is implemented using a computing device including a processor in communication with a memory device for storing data. The method includes receiving, from a payment processing computing device, a clearing detail record. The clearing detail record includes (i) a unique chargeback reference number associated with clearing and settlement of a first chargeback transaction, and (ii) a first set of chargeback transaction data associated with the first chargeback transaction including a chargeback transaction amount and an account identifier. The method also includes receiving, from a dispute management computing device, a first chargeback response message including a unique chargeback identifier associated with the first chargeback transaction and indicating acceptance of the first chargeback transaction by the dispute management processor. The method further includes determining, based on the account identifier and the unique chargeback reference number, whether the first chargeback response message matches the clearing detail record, and, when the first chargeback response message matches the clearing detail record, generating an individual reconciliation record, wherein the individual reconciliation record includes data from the first chargeback response message and the clearing detail record. The method also includes transmitting the individual reconciliation record to an issuer of a payment account associated with the account identifier.

BRIEF DESCRIPTION OF THE DRAWINGS

FIGS. 1-9 show example embodiments of the methods and systems described herein.

FIG. 1 is a simplified schematic diagram of an example process flow between components of a chargeback processing system including an issuer processor for providing individual chargeback transaction details to an issuer.

FIG. 2 is a simplified schematic diagram of another example process flow between components of the chargeback processing system shown in FIG. 1.

FIG. 3 illustrates an example chargeback response message used by the chargeback processing system shown in FIGS. 1 and 2.

FIG. 4 illustrates an example clearing record detail used by the chargeback processing system shown in FIGS. 1 and 2.

FIG. 5 illustrates an example dispute record generated by the issuer processor shown in FIG. 1.

FIG. 6 illustrates an example an individual reconciliation file generated by the issuer processor shown in FIGS. 1 and 2.

FIG. 7 is an example flow diagram for a method of processing an individual chargeback transaction.

FIG. 8 is an example flow diagram for another method of processing an individual chargeback transaction.

FIG. 9 is a schematic diagram of a computing device that may be used in the chargeback processing system shown in FIG. 1.

DETAILED DESCRIPTION

Figure 1:
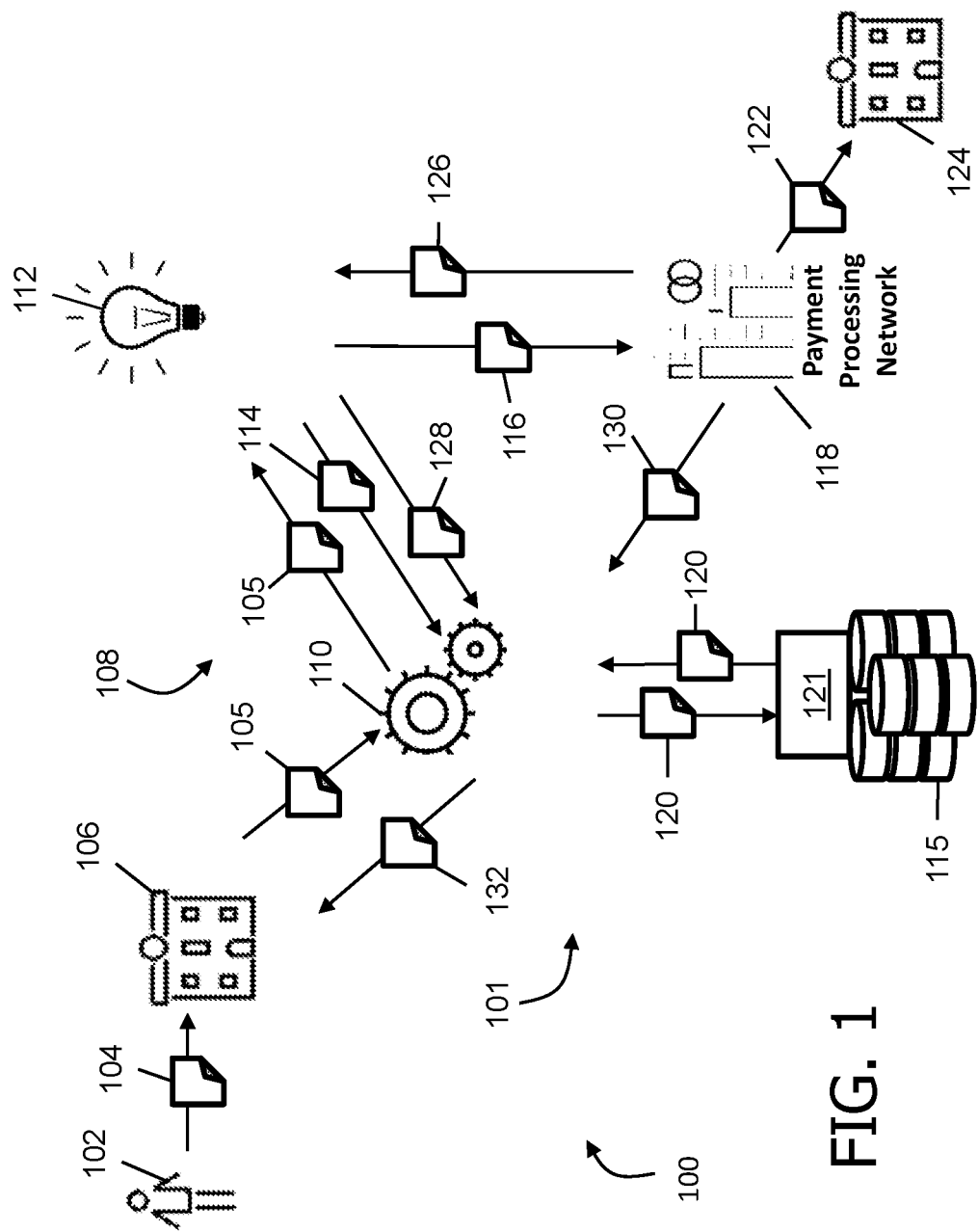

The systems and methods described herein are directed to generating a chargeback reconciliation message containing individual reconciliation records for individual chargeback transactions. Each individual reconciliation record includes a plurality of chargeback details, including, for example and without limitation, a net settlement amount, currency information, and any chargeback/settlement details for the issuer to track and record completed chargeback transactions.

A customer (also referred to herein as a payor, user, or cardholder) initiates an original purchase transaction (a "payment transaction" or a "purchase transaction") by providing their payment credentials (e.g., a credit or debit card number, a bank account number, user log-in information corresponding to saved payment credentials, digital wallet information, etc.) to a merchant for the exchange of goods and services.

In some known cases, the customer may be unsatisfied with the goods and services received from the merchant. The customer may return or exchange the goods and services and request a chargeback (i.e., a refund of funds) from the cardholder's issuer. In general, the issuer immediately issues a credit to the customer's account for the amount of the transaction. The issuer then typically sends a chargeback request to an issuer processor. The issuer processor may receive a plurality of chargeback requests from a particular issuer and submit a batch file containing the plurality of chargeback requests to a payment card network for chargeback processing and settlement. After the batch of chargeback requests have been processed by the appropriate acquiring banks (e.g., the acquiring banks associated with the merchant(s) involved in the original purchase transaction (s)), a batch reconciliation file is transmitted back to the issue processor. The issue processor then transmits the batch reconciliation file on to the issuer.

In some known cases, the batch reconciliation file contains only a total net amount that potentially covers a plurality of chargeback transactions, without identifying how individual chargeback transactions were settled. For example, the chargeback transactions may have involved the use of currency exchange rates. In such cases, the currency exchange rate applied on the date of each original purchase transaction may differ from the current exchange rate applied on the date that each individual chargeback request was submitted. As such, some of the chargeback transactions may result in a gain or a loss to the issuer, due to the variability in currency exchange rates. However, because these known batch reconciliation files only provide a net settlement amount, an issuer cannot determine, with respect to individual chargeback transactions, whether a gain or a loss was realized upon receipt of settlement funds from the payment card network. In addition, addressing gains or losses being realized upon receipt of settlement funds from the payment card network requires manual intervention (per transaction) to reconcile an 'out-of-balance' condition, and then the creation of a separate adjustment transaction for the difference.

The systems and processes described herein include transmitting and receiving a plurality of messages between a customer, an issuer, an issuer processor, a dispute management processor, and a payment processing network (e.g., a processing server device of the payment processing network). The customer, who has a financial account with the issuer, initiates a chargeback request with the issuer. The issuer transmits the chargeback request to either the issuer processor or the dispute management processor for chargeback settlement. For each accepted chargeback request, the issuer processor facilitates the processing and settlement of an associated chargeback transaction, as described herein, such as by transmitting messages and data between the payment card network, the dispute management processor, and the issuer.

In some embodiments of the present disclosure, all chargeback requests are transmitted to the dispute management processor (e.g., by the issuer processor or the issuer itself), and the dispute management processor transmits the chargeback requests to the payment processing network for further settlement with acquirers and/or merchants. The issuer processor receives chargeback responses from the payment card network and the dispute management processor. The issuer processor utilizes information contained in these responses to create a detailed reconciliation file for each individual chargeback request. The issuer processor transmits the detailed reconciliation file back to the issuer, such that the issuer may post and settle each individual chargeback request.

At least one technical problem to be solved by the systems and methods provided herein includes: (i) inability of an issuer to determine details for individual chargeback transactions contained within a reconciliation chargeback message, such as interchange, currency and or chargeback information for an individual chargeback transaction, and (ii) inability of an issuer to track the status and progress of chargeback transactions, particularly in a system in which all chargeback transactions are transmitted through a gateway dispute manager.

The technical effect of the systems and processes described herein may achieved by performing at least one of the following steps: (i) receiving a plurality of chargeback requests, (ii) transmitting the plurality of chargebacks to a dispute management computing device, (iii) receiving a chargeback acceptance message including a unique chargeback identifier, (iv) storing, in a dispute table, a dispute record associated with the chargeback request and including the unique chargeback identifier, (v) receiving a clearing detail record, including a unique chargeback reference number, (vi) receiving a first chargeback response associated with the first chargeback transaction, including the unique chargeback identifier, the unique chargeback reference number, and the first set of chargeback transaction data, (vii) determining, based on the account identifier and the unique chargeback reference number, whether the first chargeback response message matches the clearing detail record, (viii) determining, based on the account identifier and the unique chargeback identifier, whether the dispute table includes a matching dispute record including the account identifier and the unique chargeback identifier, (ix) generating an individual reconciliation record, wherein the individual reconciliation record includes data from the first chargeback response, the clearing detail record, and the dispute matching dispute record, and (x) transmitting the individual reconciliation record to the issuer of a payment account associated with the account identifier.

A technical effect or improvement provided by the systems and processes described herein include at least one of: (i) enabling the issuer to determine chargeback details for individual chargeback transactions contained in a reconciliation chargeback message, chargeback details including chargeback amounts, interchange, exchange rates, etc., (ii) facilitating an issuer processor to track requests and generate records for the issuer, (iii) tracking information, such as interchange and currency information, for individual requests, and (iv) matching data between separate systems to track the requests and generate the records, based on data redundancy and using an issuer processor at centralized location within a chargeback processing system.

As used herein, a processor may include any programmable system including systems using micro-controllers, reduced instruction set circuits (RISC), application specific integrated circuits (ASICs), logic circuits, and any other circuits or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and thus are not limiting as to the types of memory usable for saving of a computer.

In one embodiment, a computer program is provided, and the program is embodied on a computer readable medium. In an example embodiment, the data optimization system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, a card that is part of a digital wallet, and/or any other device that may hold payment account information, such as mobile phones, smartphones, personal digital assistants (PDAs), key fobs, and/or computers. Each type of transaction card can be used as a method of payment for performing a transaction. As used herein, the term "payment account" is used generally to refer to the underlying account associated with the transaction card.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram of an example embodiment of a chargeback transaction process 100 using an issuer processor in accordance with the present disclosure. Chargeback transaction process 100 is implemented, in the example embodiment, by a chargeback processing system 101 including an issuer processor 110 (also referred to herein as an "issuer processing computing device"), a dispute management processor 112, and a payment processing network 118.

Issuer processor 110 is associated with an issuer 106 of payment cards and associated payment accounts. In the example embodiment, issuer processor 110 is a separate entity configured to perform various processing functions on behalf of issuer 106, such as chargeback and dispute management, settlement, clearing, and the like. In such embodiments, issuer 106 accesses the functionality of issuer processor 110 via a web-based application executed at a computing device of issuer 106. The web-based application is maintained by issuer processor 110 and enables issuer 106 to submit chargeback requests, view the status of chargebacks during processing thereof, and receive settlement and clearing records (e.g., reconciliation records) from issuer processor 110, as described further herein. In other embodiments, issuer processor 110 may be integral to an issuer system, such that issuer processor 110 is maintained by issuer 106.

Dispute management processor 112 is a computing device specifically configured to execute chargeback and dispute management functions. In the example embodiment, dispute management processor 112 functions as a gateway to payment processing network 118, for transmitting various dispute messages to associated parties (e.g., merchants, acquirers, and/or issuers associated with a particular chargeback transaction). Dispute management processor 112 manages the dispute process until a chargeback is accepted (e.g., the merchant or acquirer accepts the chargeback and agrees to return funds to the cardholder) or denied (e.g., the merchant or acquirer does not accept the chargeback). Dispute management processor 112 communicates with issuer processor 110 about the status of a chargeback request (e.g., accepted or denied) and the status of the overall chargeback transaction (e.g., in progress, settled, etc.) over a communication network other than payment processing network 118, such as an Internet-based communication network.

Payment processing network 118 includes a set of proprietary communications standards for the exchange of financial transaction data and the settlement of funds between financial institutions. Payment processing network 118 is configured to process payment/purchase transactions for a plurality of cardholders with a plurality of merchants, by transmitting various authorization request and response messages between parties to the transaction (e.g., the merchant, an acquirer, and an issuer). Payment processing network 118 is also configured to process accepted chargeback requests (e.g., chargeback transactions) for cardholders by transmitting chargeback request, response, and instruction messages between parties to the chargeback (e.g., the merchant, the acquirer, and the issuer). As used herein, "payment processing network" refers broadly to the network and/or to one or more computing devices associated therewith (e.g., payment processors or payment processing computing devices).

In the example embodiment, once a chargeback request is accepted and processed, a clearing process occurs to transfer additional transaction data related to the original purchase transaction and the chargeback transaction among the parties to the chargeback transaction, such as the acquirer, payment processing network 118, and issuer 106. More specifically, during and/or after the clearing process, additional data, such as transaction data associated with the initial purchase transaction (e.g., a time of purchase, a merchant name, a type of merchant, purchase information, cardholder account information, a type of transaction, information regarding the purchased item and/or service) and chargeback data associated with the completed chargeback transaction is associated with the chargeback transaction and transmitted between parties to the chargeback transaction as transaction clearing data, and may be stored by any of the parties to the chargeback transaction. After a chargeback transaction is cleared, the chargeback transaction is settled among the merchant, the acquirer, and issuer 106. Settlement refers to the transfer of financial data or funds among the merchant's account, the acquirer, and issuer 106 related to the chargeback transaction. A chargeback transaction is typically settled between issuer 106 and payment processing network 118, then between payment processing network 118 and the acquirer, and then between the acquirer and the merchant. Usually, as described above, chargeback transactions are captured and accumulated into a "batch," which is settled as a group.

According to the present disclosure, chargeback processing system 101 facilitates managing individual chargeback transactions and generating settlement records for individual chargeback transactions, rather than reporting only "batched" settlements.

To initiate a chargeback transaction, a cardholder 102 submits a chargeback request 104 to issuer 106. Chargeback request 104 may be associated with a return of goods or services provided by a merchant for an original purchase transaction, or with a reported fraudulent transaction. Cardholder 102 has a financial account with issuer 106 and made the original purchase transaction using the financial account. In chargeback request 104, cardholder 102 may request reimbursement for the total amount of the original transaction (e.g., in cases of a complete return), or some amount less than the total amount (e.g., for a partial return). Issuer 106 transmits chargeback request 104 received from cardholder 102 to issuer processor 110 as a chargeback initiation request 105, to initiate a chargeback transaction 108. As used herein, a chargeback transaction 108 refers to an accepted chargeback request 104 that undergoes further processing (including clearing and settlement) between various parties (e.g., the issuer, the acquirer, and the payment processing network) to be completed.

Chargeback initiation request 105 includes transaction data relating to the original purchase transaction. For example, chargeback initiation request 105 may include a total purchase amount, an interchange rate (e.g., an amount paid to the issuer by the merchant for processing the original purchase transaction), a date/time of the original purchase transaction, and an account identifier of the cardholder's 102 financial account with issuer 106 (e.g., a payment identification number (PAN)). Chargeback initiation request 105 may also include currency exchange rates applicable to the original purchase transaction and/or currency exchange rates applicable at the time chargeback request 104 was submitted. Chargeback initiation request 105 also includes a chargeback amount, which represents the amount of funds cardholder 102 is requesting be refunded thereto. The chargeback amount may be the total purchase amount of the original purchase transaction or some value less than the total purchase amount. In some embodiments, issuer 106 transmits a batch file (not shown) to issuer processor 110, the batch file containing a plurality of individual chargeback initiation requests 105 associated with a plurality of individual chargeback requests 104.

Issuer processor 110 transmits chargeback initiation request 105 to dispute management processor 112 for further chargeback processing. In some embodiments, issuer processor 110 may transmit a batch file (not shown) to dispute management processor 112, the batch file containing a plurality of individual chargeback initiation requests 105 received from multiple issuers 106. Dispute management processor 112 processes each individual chargeback initiation request 105 and generates a unique chargeback identifier for each individual chargeback initiation request 105. For example, in some embodiments, the unique chargeback identifier is a 19-digit number representing or associated with an individual chargeback transaction 108. The unique chargeback identifier represents chargeback transaction 108 within dispute management processor 112. In some embodiments, where dispute management processor 112 receives a batch file containing multiple chargeback initiation requests 105, dispute management processor 112 generates a unique chargeback identifier for each individual chargeback initiation request 105 contained within the batch file. The unique chargeback identifier may act as a confirmation (e.g., a receipt) that dispute management processor 112 has received and accepted a chargeback initiation request 105.

Dispute management processor 112 transmits a chargeback acceptance message 114 to issuer processor 110. Chargeback acceptance message 114 includes the unique chargeback identifier for each chargeback initiation request 105 received from issuer processor 110. In response to receiving chargeback acceptance message 114, issuer processor 110 saves a dispute record 120 (also referred to as an "entry") to a dispute table 121 stored within a dispute database 115 to which issuer processor 110 is communicatively coupled. Issuer processor 110 may assign a unique dispute identification number to each individual dispute record 120. Issuer processor 110 saves a plurality of dispute records 120 to dispute table 121, each dispute record associated with an individual chargeback transaction 108. Dispute records 120 may include information contained in chargeback initiation request 105 such as the cardholder's account identifier (e.g., PAN), currency information, the chargeback amount, and the interchange amount. In addition, the dispute record 120 includes the unique chargeback identifier provided by dispute management processor 112 in dispute response message.

Dispute management processor 112 also generates a unique chargeback reference number for each chargeback transaction 108. For example, the unique chargeback reference number may be a 10-digit number representing each individual chargeback transaction 108. The unique chargeback reference number is used to represent chargeback transaction 108 in communications between dispute management processor 112 and payment processing network 118. For example, the unique chargeback reference number may be used by payment processing network 118, dispute management processor 112, issuer processor 110, and an acquiring bank to track chargeback initiation request 105. In some embodiments, the unique chargeback reference number is a 10-digit number or an alphanumeric code. Dispute management processor 112 also transmits a chargeback message 116 to payment processing network 118 for chargeback processing. Chargeback message 116 includes information contained in chargeback initiation request 105 as well as the unique chargeback reference number generated by dispute management processor 112. In some embodiments, dispute management processor 112 transmits a batch file (not shown) containing a plurality of chargeback messages 116 to payment processing network 118.

In response to receiving chargeback message 116, payment processing network 118 transmits a first network chargeback message 122 to an acquiring bank 124 for settlement of chargeback transaction 108. First network chargeback message 122 includes settlement instructions that, upon being processed by acquiring bank 124, direct acquiring bank 124 to settle chargeback transaction 108 in the chargeback amount (e.g., remit funds to issuer 106 in the chargeback amount from an account associated with the merchant). Payment processing network 118 determines which acquiring bank 124 to transmit first network chargeback message 122 to, based on information contained in chargeback message 116. Specifically, payment processing network 118 parses chargeback message for an acquirer identifier associated with the original purchase transaction and transmits first network chargeback message 122 to acquiring bank 124 associated with that acquirer identifier. Payment processing network 118 also determines or receives a currency exchange rate for the day and applies it to each chargeback transaction 108 identified in chargeback message 116, such that the chargeback amount identified in first network chargeback message 122 reflects the most current currency exchange rate.

Acquiring bank 124 processes first network chargeback message 122 and settles chargeback transaction 108 in the chargeback amount. In some embodiments, acquiring banks 124 do not actively respond to chargeback messages 122. In other embodiments, acquiring banks 124 transmit a response message (not shown) representing acknowledgement from acquiring banks 124 to payment processing network 118 of the receipt of first network chargeback messages 122 and confirmation that settlement is complete. Inasmuch as chargeback transactions 108 are known as "force post" transactions, chargeback transactions 108 are settled whether or not acquiring banks 124 agree with chargeback transaction 108.

Payment processing network 118 transmits a clearing detail record 130 to issuer processor 110. Clearing detail record 130 includes all of the data received from dispute management processor 112 in chargeback message 116, including the unique chargeback reference number and the cardholder's 102 account identifier (e.g., PAN), and the initial chargeback transaction amount. Clearing detail record 130 also includes the chargeback interchange amount applied to chargeback transaction 108, any currency exchange information, the net settlement amount, and any additional settlement information. Issuer processor 110 stores the received clearing detail record 130 (e.g., in dispute database 115 or in a different storage location).

Payment processing network 118 also transmits a second network chargeback message 126 to dispute manager processor 112. Second network chargeback message 126 includes a net settlement amount (e.g., the chargeback amount reflecting any currency exchange rates and less the interchange amount) and all corresponding chargeback transaction details including a chargeback status for each individual chargeback transaction 108.

In response to receiving second network chargeback message 126, dispute management processor 112 transmits a chargeback response message 128 to issuer processor 110. Chargeback response message 128 contains information from second network chargeback message 126, including the status of chargeback transaction 108, the cardholder's account identifier (e.g., PAN), the net settlement amount, the chargeback interchange amount applied, any currency exchange information, and any other settlement information. Chargeback response message 128 also includes the chargeback identifier, as well as the chargeback reference number associated with chargeback transaction 108. Issuer processor 110 stores the received chargeback response message 128 (e.g., in dispute database 115 or in a different storage location).

Issuer processor 110 performs a first matching operation to determine information for generating a chargeback transaction reconciliation record 132 associated with chargeback transaction 108 for issuer 106. Issuer processor 110 parses clearing detail record 130 for the account identifier and chargeback reference number therein. Issuer processor 110 queries dispute database 115 (or another storage location in which chargeback response messages 128 are stored) for a matching chargeback response message 128, using the account identifier and the chargeback reference number.

If a matching chargeback response message 128 is returned, issuer processor 110 performs a second matching operation to determine whether a matching dispute record 120 is saved in dispute table 121 and stored in dispute database 115. Issuer processor 110 parses the matching chargeback response message 128, identified during the first matching operation, to identify the unique chargeback identifier. Issuer processor 110 queries dispute table 121 using the chargeback identifier and the account identifier for a matching dispute record 120.

If a matching dispute record 120 is returned, issuer processor 110 compiles information contained in clearing detail record 130, the matching chargeback response message 128, and the matching dispute record 120 to generate the individual reconciliation record 132. Each individual reconciliation record 132 contains, for example, the cardholder's 102 account identifier, any currency exchange information, the original chargeback transaction amount, the interchange amount, the chargeback status, and the net settlement amount, as well as the chargeback reference number and the chargeback identifier. Each individual reconciliation record 132 contains any additional or alternatively information used by issuer 106 to post and settle the chargeback transaction 108.

In some embodiments, issuer processor 110 may perform the first and second matching operations for a plurality of chargeback transactions 108 and generate a plurality of individual reconciliation records 132 associated with a specific issuer 106. Issuer processor 110 may then transmit a reconciliation file to issuer 106. The reconciliation file may contain a plurality of individual reconciliation records 132. Issuer 106 may access reconciliation records using the web-based application through which issuer 106 initiated chargeback transaction 108.

In some cases, the first matching process is unsuccessful. For example, issuer processor 110 does not identify a chargeback response message 128 that matches clearing detail record 130 (e.g., no chargeback response message includes an identical account identifier and an identical chargeback reference number to clearing detail record 130). In such cases, issuer processor 110 generates reconciliation record 132 using only information contained within clearing detail record 130. For example, reconciliation record 132 includes the chargeback reference number interchange information, and the net settlement amount.

In some cases, the first matching process is successful, but the second matching process is unsuccessful. For example, issuer processor 110 does not identify a dispute record 120 that matches the matching chargeback response message 128 (e.g., dispute database 115 returns no dispute records including an identical chargeback identifier and an identical account identifier). In such cases, issuer processor 110 generates reconciliation record 132 using information contained in clearing detail record 130 and the matching chargeback response message 128 identified during the first matching operation. For example, reconciliation record 132 may include interchange information, the net settlement amount, the chargeback reference number, and the chargeback identifier.

Figure 2:
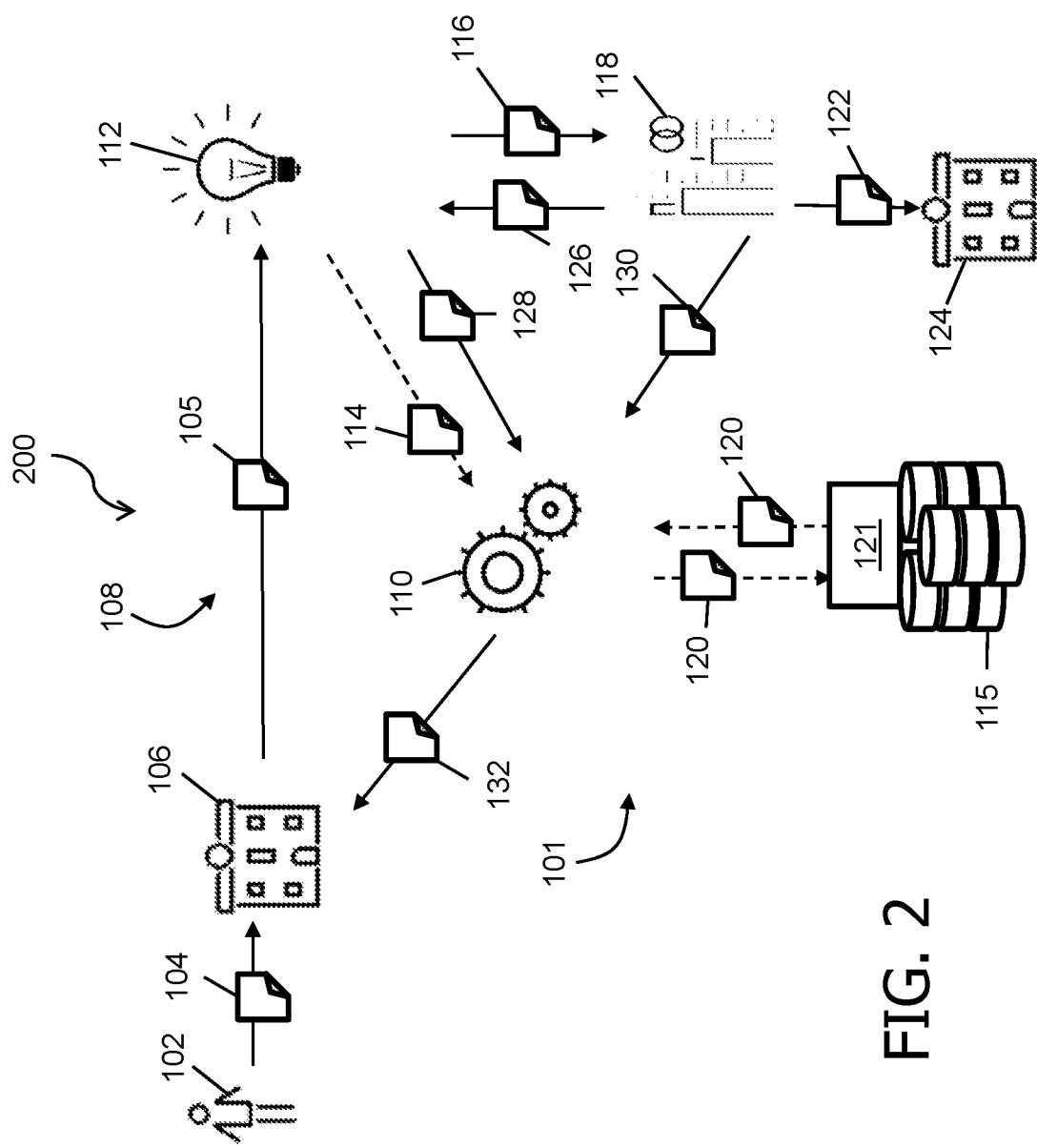

FIG. 2 is a schematic diagram of another example embodiment of a chargeback transaction process 200 in accordance with the present disclosure. Process 200 is similar to process 100, but process 200 omits issuer processor 110 receiving chargeback initiation request 105 from issuer 106. Rather, issuer 106 submits chargeback initiation request 105 directly to dispute management processor 112

Specifically, process 200 begins with cardholder 102 submitting chargeback request 104 to issuer 106, as in process 100. Issuer 106 transmits chargeback request 104 received from cardholder 102 to dispute management processor 112 as a chargeback initiation request 105, to initiate a chargeback transaction 108. In some embodiments, issuer 106 transmits a batch file (not shown) containing a plurality of individual chargeback initiation requests 105 to dispute management processor 112.

In some embodiments, dispute management processor 112 maintains a dispute management interface that is accessible to issuer 106, similar to the web application offered by issuer process 110 as described above. To submit chargeback initiation request 105, issuer 106 may enter details associated with chargeback transaction 108 to the dispute management interface. Dispute management processor 112 processes chargeback transaction 108 as described above, and process 200 proceeds similar to process 100. In some other cases, issuer 106 may access the dispute management user interface through a mobile application executed on a mobile device.

Issuer processor 110 may then perform a first matching operation similar to the first matching operation described above with respect to process 100. Specifically, issuer processor 110 parses clearing detail record 130 (received from payment processing network 118) for the account identifier and chargeback reference number therein. Issuer processor 110 queries dispute database 115 (or another storage location in which chargeback response messages 128 are stored) for a matching chargeback response message 128 (received from dispute management processor 112), using the account identifier and the chargeback reference number.

Notably, in some embodiments of process 200 (i.e., where issuer 106 submits chargeback initiation request 105 directly to dispute management processor 112), issuer processor 110 may not build dispute table 121 in dispute database 115 before chargeback transaction 108 is settled. Rather, issuer processor 110 may build dispute table 121 using information received from dispute management processor 112 and/or payment processing network 118 after chargeback transaction 108 is settled, for the purposes of record maintenance.

In such embodiments, if the first matching operation is successful (i.e., the matching chargeback response message 128 is returned), issuer processor 110 generates reconciliation record 132 using information contained in clearing detail record 130 and the matching chargeback response message 128 identified during the first matching operation. For example, reconciliation record 132 may include interchange information, the net settlement amount, the chargeback reference number, and the chargeback identifier. If the first matching operation is not successful, (e.g., no chargeback response message includes an identical account identifier and an identical chargeback reference number to clearing detail record 130). In such cases, issuer processor 110 generates reconciliation record 132 using only information contained within clearing detail record 130. For example, reconciliation record 132 includes the chargeback reference number interchange information, and the net settlement amount.

In other embodiments, issuer processor 110 builds dispute table 121 in dispute database 115 as described with respect to process 100. That is, issuer processor 110 saves dispute records 120 based on chargeback acceptance messages 114 from dispute management processor 112. In such embodiments, issuer processor 110 performs the first and second matching operations as described above with respect to process 100.

Figure 3:
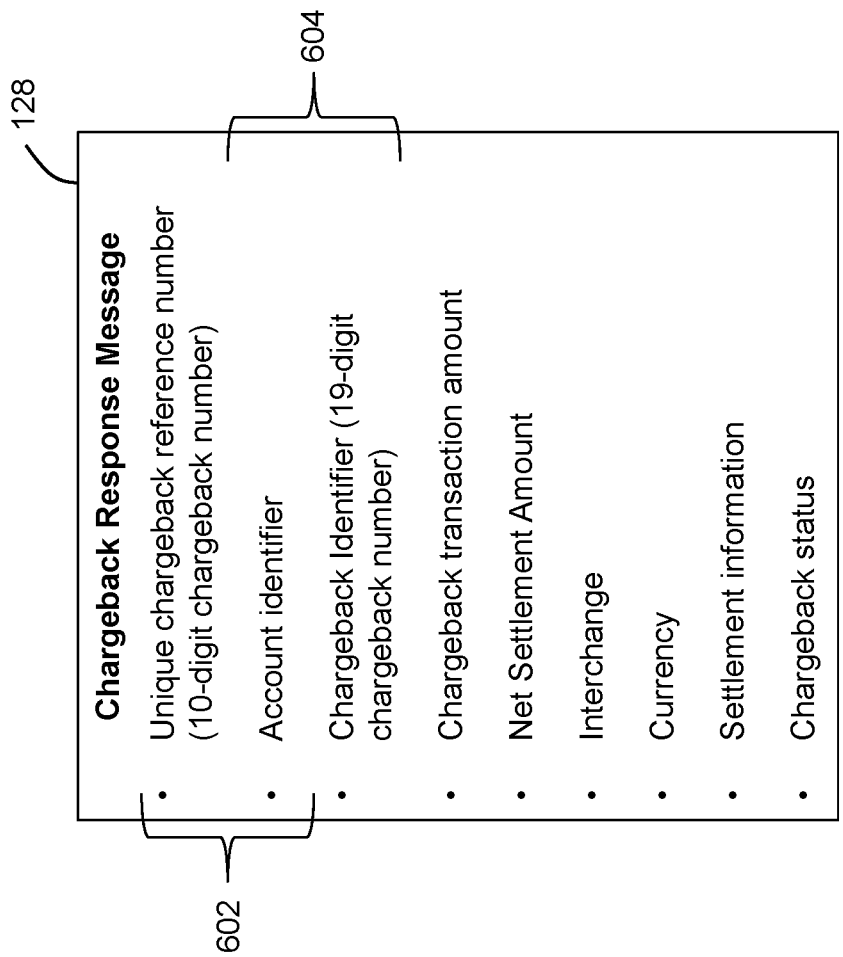

FIG. 3 illustrates an example chargeback response message, such as chargeback response message 128, shown in FIGS. 1 and 2. In the example embodiment, chargeback response message 128 is generated by dispute management processor 112 (and transmitted to issuer processor 110 (both shown in FIGS. 1 and 2). Chargeback response message 128 includes data associated with a chargeback transaction (e.g., chargeback transaction 108, also shown in FIGS. 1 and 2). For example, chargeback response message 128 may include a cardholder's account identifier (e.g., PAN), a unique chargeback reference number (e.g., a 10-digit chargeback reference number), a unique chargeback identifier (e.g., a 19-digit chargeback identifier), the initial chargeback transaction amount, the net settlement amount, applicable interchange information, currency codes and exchange information, a status of the associated chargeback transaction, and any other chargeback settlement information.

Figure 4:
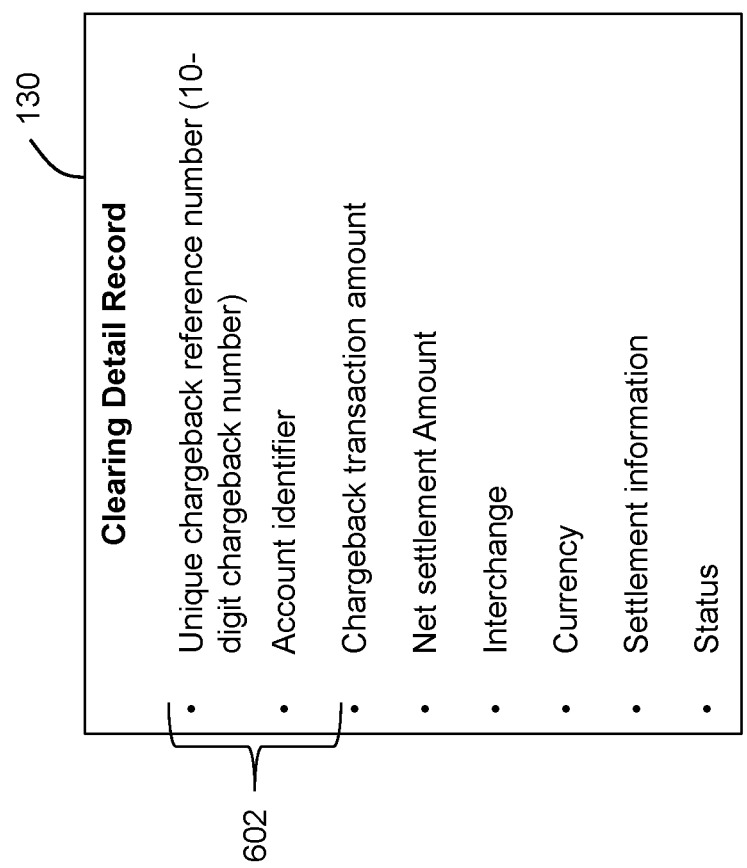

FIG. 4 illustrates an example clearing detail record, such as clearing detail record 130, shown in FIGS. 1 and 2. In the example embodiment, clearing detail record 130 is generated by payment processing network 118 and transmitted to issuer processor 110. Clearing detail record 130 includes data associated with the chargeback transaction. Clearing detail record 130 includes a plurality of data fields, including the unique chargeback reference number, the account identifier, the initial chargeback transaction amount, the net settlement amount, interchange information, currency codes and exchange information, the status of the associated chargeback transaction, and any other settlement information.

Figure 5:
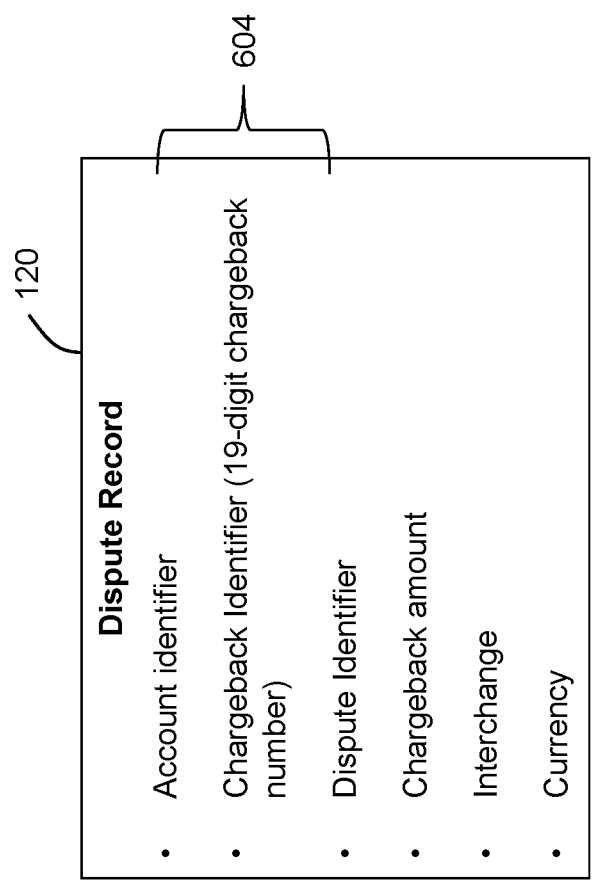

FIG. 5 illustrates an example dispute record, such as dispute record 120, shown in FIGS. 1 and 2. In some embodiments, dispute record 120 is stored in a dispute table (e.g., dispute table 121) contained in a memory (e.g., dispute database 115, both shown in FIGS. 1 and 2). Issuer processor may access the memory to retrieve dispute record 120 during a matching process, as described herein. Dispute record 120 includes data from a chargeback response message 128, such as the unique chargeback identification number, the account identifier, interchange information, currency codes and exchange information, and any additional settlement information. Dispute record 120 also includes a dispute identifier generated by issuer processor 110 and the initial chargeback transaction amount.

With reference to FIGS. 1 and 3-6, issuer processor 110 utilizes one or more of chargeback response message 128, clearing detail record 130, and dispute record 120 to generate an individual reconciliation record 132, an example of which is shown in FIG. 6 (also shown in FIGS. 1 and 2). Issuer processor 110 initiates a first matching operation using data 602 parsed from clearing detail record 130, such as the unique chargeback reference number and the account identifier. Issuer processor 110 attempts to identify a matching chargeback response message 128 including the same data 602 (e.g., by querying a memory using data 602). The clearing detail record 130 and the matching chargeback response message 128 are both associated with the same chargeback transaction.

After the first matching operation, issuer processor 110 performs a second matching operation using data 604 parsed from the matching chargeback response message 128, such as the chargeback identifier and the account identifier. Issuer processor 110 attempts to identify a matching dispute record 120 from within the dispute table that includes the same data 604 (e.g., by querying dispute database 115). The matching dispute record 120, the matching chargeback response message 128, and the clearing detail record 130 are associated with the same chargeback transaction.

When the first and second matching operations are successful, issuer processor 110 generates individual reconciliation record 132 including data from the matching dispute record 120, the matching chargeback response message 128, and the clearing detail record 130. Individual reconciliation record 132 includes data associated with a settled/posted chargeback transaction, such as the unique chargeback identifier, the account identifier, the dispute identifier, unique chargeback reference number, the initial chargeback transaction amount, interchange information, currency code and exchange information, the chargeback status, and the net settlement amount.

Figure 7:
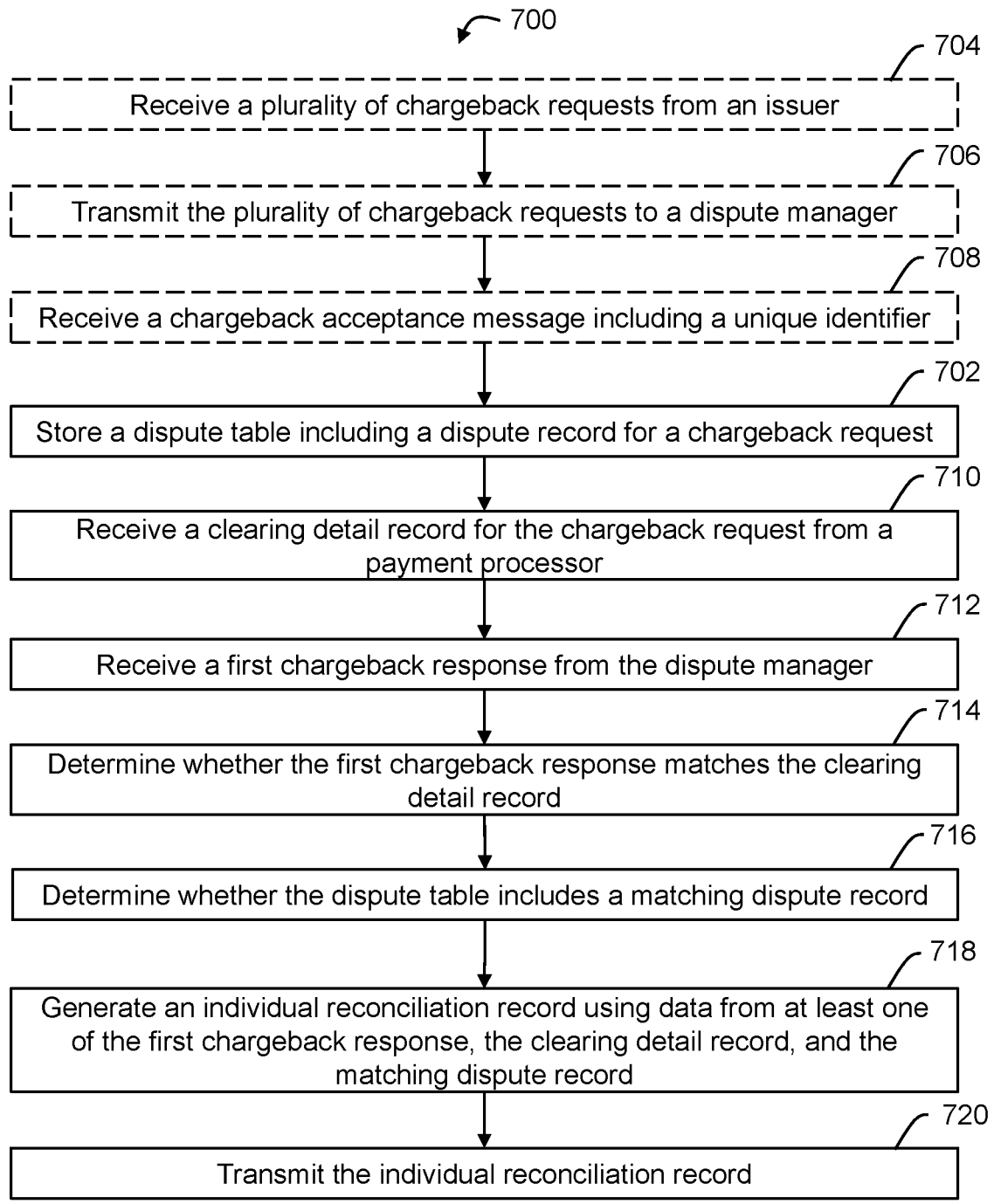

FIG. 7 is a process flow of an example method 700 for a processing a chargeback transaction (e.g., chargeback transaction 108). Method 700 may be implemented at least in part by an issuer processor (e.g., issuer processor 110, shown in FIGS. 1 and 2).

In the example embodiment, method 700 includes storing 702, in a dispute table (e.g., dispute table 121) in a memory (e.g., dispute database 115, both shown in FIG. 1), a dispute record (e.g., dispute record 120, also shown in FIG. 1) associated with a first chargeback request (e.g., chargeback request 104). The first chargeback request is associated with a first chargeback transaction and includes a first set of chargeback transaction data including a first chargeback transaction amount and an account identifier associated with the first chargeback transaction (e.g., a PAN). The dispute record includes the account identifier, the first chargeback transaction amount, and a unique chargeback identifier indicating acceptance of the first chargeback transaction (e.g., as generated by and/or received from a dispute management processor such as dispute management processor 112, shown in FIG. 1). The dispute record may include additional data element, such as an internal identifier for the first chargeback request (e.g., assigned by the issuer processor), currency information, interchange information, and the like.

In some embodiments, method 700 includes additional steps prior to storing 702. In particular, method 700 may include receiving 704 a plurality of chargeback requests including the first chargeback request. The chargeback requests may be received over an electronic network from an issuer (e.g., issuer 106). Method 700 may also include transmitting 706 the plurality of chargeback requests including the first chargeback request to a dispute management processor, for example, as a chargeback initiation request (e.g., chargeback initiation request 105) for further chargeback processing. The chargeback initiation request includes the first set of chargeback transaction data, as well as data relating to the original purchase transaction. For example, the chargeback initiation request may include a total purchase amount, an interchange rate (e.g., an amount paid to the issuer by the merchant for processing the original purchase transaction), a date/time of the original purchase transaction, and the account identifier of the cardholder's financial account with the issuer. The chargeback initiation request may also include currency exchange rates applicable to the original purchase transaction and/or currency exchange rates applicable at the time the chargeback request was submitted. As described herein, the dispute management processor is configured to process the chargeback initiation request and generate a unique chargeback identifier therefor (e.g., a 19-digit number representing or associated with the first chargeback transaction).

In some embodiments, method 700 further includes receiving 708 a chargeback acceptance message (e.g., a chargeback acceptance message 114) from the dispute management processor. The chargeback acceptance message includes the unique chargeback identifier for each of the chargeback transaction, such that the issuer processor may store 702 the dispute record including the unique chargeback identifier. The dispute management processor may also transmit a chargeback message (e.g., chargeback message 116) to the payment processing network for chargeback processing, as described above (see FIG. 1). The chargeback message includes information contained in the chargeback initiation request as well as the unique chargeback reference number, as described herein.

Method 700 also includes receiving 710 a clearing detail record (e.g., a clearing detail record 130). The clearing detail record may be received from a payment processing network or computing device thereof (e.g., payment processing network 118). The clearing detail record includes the unique chargeback reference number associated with clearing and settlement of the first chargeback transaction and the first set of chargeback transaction data. The clearing detail record may also include a status of the first chargeback request and/or the overall chargeback transaction, and clearing/settlement details associated with the first chargeback transaction (e.g., a chargeback interchange amount applied to the chargeback transaction, any currency exchange information, the net settlement amount, and the like).

Method 700 further includes receiving 712 a chargeback response (e.g., chargeback response message 128) from the dispute management processor. The chargeback response message includes the unique chargeback identifier, the unique chargeback reference number, and the first set of chargeback transaction data. the chargeback response message may include additional data elements, such as the status of the chargeback request and/or the overall chargeback transaction.

Method 700 further includes determining 714 whether the chargeback response matches the clearing detail record. In the example embodiment, the first chargeback response and clearing detail record match when the first chargeback response and the clearing detail record both include the same account identifier and chargeback reference number.

When the first chargeback response matches the clearing detail record, method 700 further includes determining 716, based on the account identifier and the unique chargeback identifier, whether the dispute table includes a matching dispute record including the account identifier and the unique chargeback identifier. For example, the issuer processor queries the disputes table using the chargeback identifier and the account identifier for a matching dispute record.

Method 700 further includes generating 718 an individual reconciliation record (e.g., individual reconciliation record 132). If a matching dispute record is identified (e.g., returned from the dispute table), the issuer processor generates 718 the individual reconciliation record, using data from the first chargeback response, the clearing detail record, and the dispute matching dispute record. For example, generating 718 may include generating the individual reconciliation record to include the unique chargeback reference number, the account identifier, the chargeback transaction amount, a net settlement amount, and the unique chargeback identifier. The reconciliation record may include additional data elements, such as interchange information, currency information, settlement information, and the status of the chargeback request and/or the overall chargeback transaction.

In some embodiments, when no matching dispute record is identified, method 700 may include generating the individual reconciliation record to include data only from the matched clearing detail record and the first chargeback response message. For example, the issuer processor may generate the individual reconciliation record including the unique chargeback reference number, the account identifier, the unique chargeback identifier, and a net settlement amount. The reconciliation record may include additional data elements, such as the original chargeback transaction amount, interchange information, currency information, settlement information, and the status of the chargeback request and/or the overall chargeback transaction.

In some embodiments, when the first chargeback response does not match the clearing detail record, method 700 may include generating the individual reconciliation record to include only data from the clearing detail record, including the unique chargeback reference number, the account identifier, and a net settlement amount. The reconciliation record may include additional data elements, such as the original chargeback transaction amount, interchange information, currency information, settlement information, and the status of the chargeback request and/or the overall chargeback transaction.

Method 700 also includes transmitting 720 the individual reconciliation record to an issuer. In some embodiments, method 700 includes posting the individual reconciliation record on behalf of the issuer.

Figure 8:
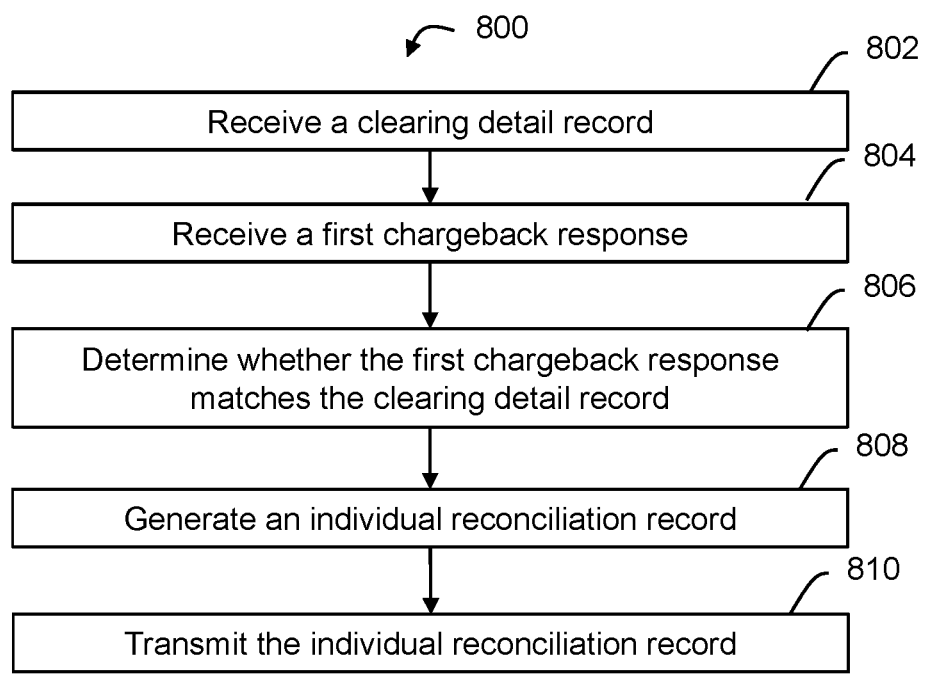

FIG. 8 is a process flow of an example method 800 for processing individual chargeback transactions. Method 800 may be implemented at least in part by an issuer processor (e.g., issuer processor 110, shown in FIGS. 1 and 2). Method 800 is similar to method 700, but is implemented in embodiments in which an issuer (e.g., issuer 106) transmits chargeback requests directly to a dispute management processor (e.g., dispute management processor 112, both shown in FIGS. 1 and 2).

Method 800 includes receiving 802 a clearing detail record (e.g., a clearing detail record 130). The clearing detail record may be received from a payment processing network or a computing device thereof. The clearing detail record includes a unique chargeback reference number associated with clearing and settlement of a first chargeback transaction of a plurality of chargeback transactions initiated by respective plurality of cardholders, and a first set of chargeback transaction data associated with the first chargeback transaction including a chargeback transaction amount and an account identifier. The clearing detail record may include additional data elements, such as a status of processing of the first chargeback transaction over a payment processing network, and clearing/settlement details associated with the first chargeback transaction.

Method 800 further includes receiving 804 a chargeback response message (e.g., chargeback response message 128) from a dispute management processor. The chargeback response message includes a unique chargeback identifier associated with the first chargeback request and indicating acceptance of the first chargeback transaction by the dispute management processor.

Method 800 further includes, determining 806 whether the chargeback response matches the clearing detail record. The first chargeback response message and clearing detail record match when the first chargeback response message and the clearing detail record both include the same account identifier and chargeback reference number.

Method 800 further includes generating 808 an individual reconciliation record (e.g., individual reconciliation record 132). When the first chargeback response message matches the clearing detail record, generating 808 includes generating 808 the individual reconciliation record using data from the first chargeback response message and the clearing detail record. For example, the individual reconciliation record includes the unique chargeback reference number, the account identifier, the unique chargeback identifier, and a net settlement amount. The reconciliation record may include additional data elements, such as the original chargeback transaction amount, interchange information, currency information, settlement information, and the status of the chargeback request and/or the overall chargeback transaction.

In some embodiments, when the first chargeback response message does not match the clearing detail record, method 800 may further include generating the individual reconciliation record including data only from the clearing detail record. For example, the individual reconciliation record includes the unique chargeback reference number, the account identifier, and a net settlement amount, The reconciliation record may include additional data elements, such as the original chargeback transaction amount, interchange information, currency information, settlement information, and the status of the chargeback request and/or the overall chargeback transaction.

Method 800 also includes transmitting 810 the individual reconciliation record to the issuer of the payment account associated with the chargeback transaction. In some embodiments, transmitting 810 includes transmitting 810 the individual reconciliation record to the dispute management processor, which may then transmit the individual reconciliation record to an issuer.

Figure 9:
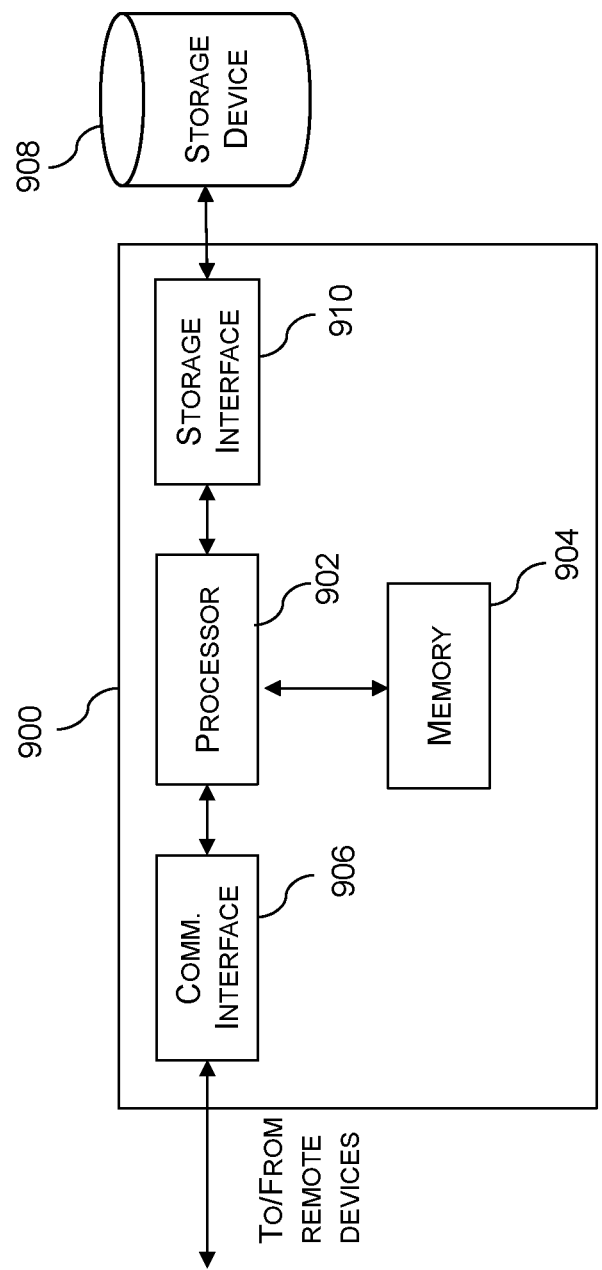

FIG. 9 illustrates an example configuration of a server computing device 900, such as an issuer processor (e.g., issuer processor 110), a dispute management processor (e.g., dispute management processor 112), or a payment processing network computing device (e.g., a computing device of payment processing network 118, all shown in FIGS. 1 and 2). Computing device 900 includes a processor 902 for executing instructions. Instructions may be stored to a memory 904. Processor 902 may include one or more processing units (e.g., in a multi-core configuration) for executing instructions. The instructions may be executed within a variety of different operating systems on data optimizing computing device, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 902 is operatively coupled to a communication interface 906 such that computing device 900 is capable of communication with remote devices. Processor 902 may also be operatively coupled to a storage device 908 (e.g., dispute database 115, shown in FIGS. 1 and 2). Storage device 908 is any computer-operated hardware suitable for storing and/or retrieving data. In some embodiments, storage device 908 is integrated in computing device 900. For example, computing device 900 may include one or more hard disk drives as storage device 908. In other embodiments, storage device 908 is external to computing device 900. For example, storage device 908 may include multiple storage units such as hard disks or solid state disks in a redundant array of inexpensive disks (RAID) configuration. Storage device 908 may include a storage area network (SAN) and/or a network attached storage (NAS) system.

In some embodiments, processor 902 is operatively coupled to storage device 908 via a storage interface 910. Storage interface is any component capable of providing processor 902 with access to storage device 608. Storage interface 910 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 902 with access to storage device 908.

Memory 904 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect or enabling individual chargeback tracking, settlement, and recording. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A chargeback settlement processing computing device, said chargeback settlement processing computing device communicatively coupled to a plurality of computing devices within a chargeback processing network, the plurality of computing devices including a payment processing computing device, a dispute management computing device, and a plurality of issuer computing devices, said chargeback settlement processing computing device comprising:
a memory device for storing data; and
a processor in communication with said memory device, said processor programmed to:
store, in a dispute table in said memory device, a dispute record associated with a first chargeback request initiated by a first cardholder, the first chargeback request associated with a first chargeback transaction and including a first set of chargeback transaction data including a first chargeback transaction amount and an account identifier associated with the first chargeback request, the dispute record including the account identifier, the first chargeback transaction amount, and a unique chargeback identifier indicating acceptance of the first chargeback transaction after dispute processing of the first chargeback transaction is completed;
receive, from the payment processing computing device, a clearing detail record representing clearing and settlement of the first chargeback transaction over the payment processing computing device, wherein the clearing detail record includes a unique chargeback reference number associated with clearing and settlement of the first chargeback transaction and the first set of chargeback transaction data;
receive, from the dispute management computing device, a first chargeback response message representing confirmation of the clearing and settlement of the first chargeback transaction by the dispute management computing device, wherein the first chargeback response message includes the unique chargeback identifier, the unique chargeback reference number, and the first set of chargeback transaction data;
determine, based on the account identifier and the unique chargeback reference number, whether the first chargeback response message matches the clearing detail record;
when the first chargeback response message matches the clearing detail record, determine, based on the account identifier and the unique chargeback identifier, whether the dispute table includes a matching dispute record including the account identifier and the unique chargeback identifier;
when a matching dispute record is identified, generate an individual reconciliation record, wherein the individual reconciliation record includes data from the first chargeback response message, the clearing detail record, and the matching dispute record; and
transmit the individual reconciliation record to an issuer computing device of an issuer of a payment account associated with the account identifier.

2. The chargeback settlement processing computing device of claim 1, wherein said processor is further programmed to receive, from the issuer computing device, a plurality of chargeback requests associated with a respective plurality of chargeback transactions initiated by a respective plurality of cardholders, the plurality of chargeback requests including the first chargeback request.

3. The chargeback settlement processing computing device of claim 2, wherein said processor is further programmed to receive, from the issuer computing device, the plurality of chargeback requests over a web-based application maintained by said processor.

4. The chargeback settlement processing computing device of claim 1, wherein said processor is further programmed to transmit the first chargeback request to the dispute management computing device for processing.

5. The chargeback settlement processing computing device of claim 4, wherein said processor is further programmed to receive, from the dispute management computing device, a chargeback acceptance message including the unique chargeback identifier.

6. The chargeback settlement processing computing device of claim 1, wherein the data from the first chargeback response message, the clearing detail record, and the dispute table includes the unique chargeback reference number, the account identifier, the first chargeback transaction amount, the unique chargeback identifier, and a net settlement amount.

7. The chargeback settlement processing computing device of claim 1, wherein, when no matching dispute record is identified, said processor is further programmed to generate the individual reconciliation record including data from the matched clearing detail record and the first chargeback response message.

8. The chargeback settlement processing computing device of claim 7, wherein the data from the matched clearing detail record and the first chargeback response message includes the unique chargeback reference number, the account identifier, the unique chargeback identifier, the first chargeback transaction amount, and a net settlement amount.

9. The chargeback settlement processing computing device of claim 1, wherein, when the first chargeback response message does not match the clearing detail record, said processor is further programmed to generate the individual reconciliation record including data from the clearing detail record.

10. The chargeback settlement processing computing device of claim 9, wherein the data from the clearing detail record includes the unique chargeback reference number, the account identifier, the first chargeback transaction amount, and a net settlement amount.

11. The chargeback settlement processing computing device of claim 1, wherein the first chargeback response message and clearing detail record match when the first chargeback response message and the clearing detail record both include the same account identifier and chargeback reference number.

12. A chargeback settlement processing computing device, said chargeback settlement processing computing device communicatively coupled to a plurality of computing devices within a chargeback processing network, the plurality of computing devices including a payment processing computing device, a dispute management computing device, and a plurality of issuer computing devices, said chargeback settlement processing computing device comprising:
    a memory device for storing data; and
    a processor in communication with said memory device, said processor programmed to:
        receive, from the payment processing computing device, a clearing detail record, wherein the clearing detail record includes (i) a unique chargeback reference number associated with clearing and settlement of a first chargeback transaction, and (ii) a first set of chargeback transaction data associated with the first chargeback transaction including a chargeback transaction amount and an account identifier, the clearing detail record representing the clearing and settlement of the first chargeback transaction over the payment processing computing device, after dispute processing of the first chargeback transaction is completed;
        receive, from the dispute management computing device, a first chargeback response message representing confirmation of the clearing and settlement of the first chargeback transaction by the dispute management computing device, the first chargeback response message including a unique chargeback identifier associated with the first chargeback transaction and indicating acceptance of the first chargeback transaction by the dispute management processor;
        determine, based on the account identifier and the unique chargeback reference number, whether the first chargeback response message matches the clearing detail record;
        when the first chargeback response message matches the clearing detail record, generate an individual reconciliation record, wherein the individual reconciliation record includes data from the first chargeback response message and the clearing detail record; and
        transmit the individual reconciliation record to an issuer computing device of an issuer of a payment account associated with the account identifier.

13. The chargeback settlement processing computing device of claim 12, wherein the data from the first chargeback response message and the clearing detail record includes the unique chargeback reference number, the account identifier, the unique chargeback identifier, and a net settlement amount.

14. The chargeback settlement processing computing device of claim 12, wherein, when the first chargeback response message does not match the clearing detail record, said processor is further programmed to generate the individual reconciliation record including data from the clearing detail record.

15. The chargeback settlement processing computing device of claim 14, wherein the data from the clearing detail record includes the unique chargeback reference number, the account identifier, and a net settlement amount.

16. The chargeback settlement processing computing device of claim 12, wherein said processor is further programmed to post the individual reconciliation record on behalf of the issuer.

17. A computer-implemented method for generating an individual reconciliation record, the method implemented using a chargeback settlement computing device, the chargeback settlement processing computing device communicatively coupled to a plurality of computing devices within a chargeback processing network, the plurality of computing devices including a payment processing computing device, a dispute management computing device, and a plurality of issuer computing devices, the chargeback settlement processing computing device including a processor in communication with a memory device for storing data, said method comprising:
    storing, in a dispute table in the memory device, a dispute record associated with a first chargeback request associated with a first chargeback transaction and including a first set of chargeback transaction data including a first chargeback transaction amount and an account identifier associated with the first chargeback request, the dispute record including the account identifier, the first chargeback transaction amount, and a unique chargeback identifier indicating acceptance of the first chargeback transaction after dispute processing of the first chargeback transaction is completed;
    receiving, from the payment processing computing device, a clearing detail record representing clearing and settlement of the first chargeback transaction over the payment processing computing device, wherein the clearing detail record includes a unique chargeback reference number associated with clearing and settlement of the first chargeback transaction and the first set of chargeback transaction data;

receiving, from the dispute management computing device, a first chargeback response message representing confirmation of the clearing and settlement of the first chargeback transaction by the dispute management computing device, wherein the first chargeback response message includes the unique chargeback identifier, the unique chargeback reference number, and the first set of chargeback transaction data;

determining, based on the account identifier and the unique chargeback reference number, whether the first chargeback response message matches the clearing detail record;

when the first chargeback response message matches the clearing detail record, determining, based on the account identifier and the unique chargeback identifier, whether the dispute table includes a matching dispute record including the account identifier and the unique chargeback identifier;

when a matching dispute record is identified, generating an individual reconciliation record, wherein the individual reconciliation record includes data from the first chargeback response message, the clearing detail record, and the matching dispute record; and transmitting the individual reconciliation record to an issuer computing device of an issuer of a payment account associated with the account identifier.

18. The computer-implemented method of claim 17, wherein, when no matching dispute record is identified, said method further comprises generating the individual reconciliation record including data from the matched clearing detail record and the first chargeback response message.

19. The computer-implemented method of claim 17, wherein, when the first chargeback response message does not match the clearing detail record, said method further comprises generating the individual reconciliation record including data from the clearing detail record.

20. A computer-implemented method for generating an individual reconciliation record, the method implemented using a chargeback settlement computing device communicatively coupled to a plurality of computing devices within a chargeback processing network, the plurality of computing devices including a payment processing computing device, a dispute management computing device, and a plurality of issuer computing devices, the chargeback settlement processing computing device including a processor in communication with a memory device for storing data, said method comprising:

receiving, from the payment processing computing device, a clearing detail record, wherein the clearing detail record includes (i) a unique chargeback reference number associated with clearing and settlement of a first chargeback transaction, and (ii) a first set of chargeback transaction data associated with the first chargeback transaction including a chargeback transaction amount and an account identifier, the clearing detail record representing the clearing and settlement of the first chargeback transaction over the payment processing computing device, after dispute processing of the first chargeback transaction is completed;

receiving, from the dispute management computing device, a first chargeback response message representing confirmation of the clearing and settlement of the first chargeback transaction by the dispute management computing device, the first chargeback response message including a unique chargeback identifier associated with the first chargeback transaction and indicating acceptance of the first chargeback transaction by the dispute management processor;

determining, based on the account identifier and the unique chargeback reference number, whether the first chargeback response message matches the clearing detail record;

when the first chargeback response message matches the clearing detail record, generating an individual reconciliation record, wherein the individual reconciliation record includes data from the first chargeback response message and the clearing detail record; and transmitting the individual reconciliation record to an issuer computing device of an issuer of a payment account associated with the account identifier.

21. The computer-implemented method of claim 20, wherein, when the first chargeback response message does not match the clearing detail record, said method further comprises generating the individual reconciliation record including data from the clearing detail record.

* * * * *